(12) United States Patent
Chou et al.

(10) Patent No.: US 7,475,230 B2
(45) Date of Patent: *Jan. 6, 2009

(54) METHOD AND APPARATUS FOR PERFORMING REGISTER FILE CHECKPOINTING TO SUPPORT SPECULATIVE EXECUTION WITHIN A PROCESSOR

(75) Inventors: Yuan C. Chou, Mountain View, CA (US); Santosh G. Abraham, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

This patent is subject to a terminal disclaimer.

(21) Appl. No.: 10/439,909

(22) Filed: May 16, 2003

(65) Prior Publication Data

US 2004/0230778 A1 Nov. 18, 2004

(51) Int. Cl.
*G06F 7/38* (2006.01)
*G06F 9/00* (2006.01)
*G06F 9/44* (2006.01)
*G06F 15/00* (2006.01)

(52) U.S. Cl. ...................................................... 712/228
(58) Field of Classification Search ................. 712/228, 712/226
See application file for complete search history.

(56) References Cited

U.S. PATENT DOCUMENTS

| 5,574,874 | A | * | 11/1996 | Jones et al. | 712/200 |
| 5,961,636 | A | * | 10/1999 | Brooks et al. | 712/228 |
| 6,105,148 | A | * | 8/2000 | Chung et al. | 714/16 |
| 6,408,325 | B1 | * | 6/2002 | Shaylor | 718/108 |
| 6,895,527 | B1 | * | 5/2005 | Quach et al. | 714/5 |

* cited by examiner

*Primary Examiner*—Eddie P Chan
*Assistant Examiner*—Brian P Johnson
(74) *Attorney, Agent, or Firm*—Park, Vaughan & Fleming LLP (57) ABSTRACT

One embodiment of the present invention provides a system that performs register file checkpointing to support speculative execution within a processor. During operation, the system commences speculative execution of a program from a point of speculation, at which the outcome of a long latency instruction is speculatively predicted. During this speculative execution, registers are updated by checkpointing an old value of the register, if the register has not already been checkpointed, and then updating the architectural state of the register with the new value. In this way, only registers that are updated during the speculative execution are checkpointed, instead of checkpointing all of the architectural registers prior to commencing speculative execution.

21 Claims, 5 Drawing Sheets

FIG. 1

CHECKPOINT TABLE 206

| 0 | 0 |
|---|---|
| 1 | 1 |
| 1 | 1 |
| . | . |
| . | . |
| . | . |
|   |   |

CHECKPOINT QUEUE0 208

| r1 | OLD VALUE |
|---|---|
| r2 | OLD VALUE |
|   |   |
| . | . |
| . | . |
| . | . |
|   |   |

CHECKPOINT QUEUE1 209

| r1 | UPDATED VALUE |
|---|---|
| r2 | OLD VALUE |
|   |   |
| . | . |
| . | . |
| . | . |
|   |   |

ACTIVE CHECKPOINT MASK 210

| 1 | 1 |
|---|---|

FIG. 2

CHECKPOINT TABLE 306

| 0 | 0 |
|---|---|
| 1 | 1 |
| 1 | 1 |
| . | . |
| . | . |
| . | . |
|   |   |

CHECKPOINT QUEUE 302

| r1 | OLD VALUE | 1 | 0 |
|---|---|---|---|
| r1 | UPDATED VALUE | 0 | 1 |
| r2 | OLD VALUE | 1 | 1 |
| . | . | . | . |
| . | . | . | . |
| . | . | . | . |
|   |   |   |   |

VALID FIELD

ACTIVE CHECKPOINT MASK 310

| 1 | 1 |
|---|---|

METHOD AND APPARATUS FOR PERFORMING REGISTER FILE CHECKPOINTING TO SUPPORT SPECULATIVE EXECUTION WITHIN A PROCESSOR

BACKGROUND

1. Field of the Invention

The present invention relates to techniques for improving the performance of computer systems. More specifically, the present invention relates to a method and apparatus for performing register file checkpointing in an efficient manner to support speculative execution within a computer system.

2. Related Art

Speculative execution techniques (i.e. mechanisms that allow a microprocessor to execute instructions before it is known whether they should be executed and/or what their operands are) are becoming an increasingly important means of improving the performance of microprocessors. To enable speculative execution to work correctly, current microprocessors do not allow the speculative instructions to update the architectural register state until the speculation is confirmed to be correct. The register state of the speculative instructions is instead buffered in temporary registers. However, this solution is infeasible if the speculation (e.g. value predicting a load that has to access main memory because it missed the processor's caches) takes a long time to resolve. This is because a large number of instructions (on the order of hundreds) may be speculatively executed before the speculation is resolved. Consequently, the amount of register state to be buffered is prohibitive.

In such situations, the more feasible solution is to save (i.e. checkpoint) the architectural register state of the processor at the point of speculation, and to then restore this state if the speculation turns out to be incorrect. In the interval between the speculation and its resolution, the speculative instructions are free to update the architectural register state. However, checkpointing the architectural register state is a challenging technical problem for processors with large numbers of architectural registers (such as in processors that implement register windows). This is because it can potentially take a long time and a large amount of space to checkpoint and to restore the large architectural register state.

In order to save (i.e. checkpoint) the architectural register state of the processor at the point of speculation and then restore the state if the speculation turns out to be incorrect, the common technique is to copy the contents of all the architectural registers to memory or some temporary storage area at the point of speculation, and to then copy all the architectural register state from memory or the temporary storage area back into the architectural registers when the speculation is determined to be incorrect. However, this technique is inefficient if the architectural register state is large (e.g. in a processor that implements register windows) because the copy will either take many clock cycles to accomplish or require a high bandwidth and expensive copy mechanism.

This problem is further magnified if multiple checkpoints are required to facilitate nested speculative execution. Note that if the speculation takes a long time to resolve, the program is likely to encounter additional instructions where speculation is required. In order to keep executing the program in this situation, the system must be able to support nested speculation. In nested speculative execution, we speculatively predict results of additional instructions while the speculation on an earlier instruction is pending and has not been resolved. If a particular speculation is incorrect, the architectural state immediately prior to that speculation is restored. Any state maintained with subsequent speculations (such as checkpoints) may be discarded because execution is restarted from the incorrectly predicted instruction.

Hence, what is needed is a method and an apparatus for checkpointing the registers to support speculative execution without encountering the problems described above.

SUMMARY

One embodiment of the present invention provides a system that performs register file checkpointing to support speculative execution within a processor. During operation, the system commences speculative execution of a program from a point of speculation, at which the outcome of a long latency instruction is speculatively predicted. During this speculative execution, registers are updated by checkpointing an old value of the register, if the register has not already been checkpointed, and then updating the architectural state of the register with the new value. In this way, only registers that are updated during the speculative execution are checkpointed, instead of checkpointing all of the architectural registers prior to commencing speculative execution.

In a variation on this embodiment, if the speculation turns out to be incorrect, the system uses the checkpointed values to restore the architectural state of registers that have been updated during the speculative execution, and then resumes execution of the program from the point of speculation.

In a variation on this embodiment, if the speculation turns out to be correct, the system flushes the checkpointed values, and continues execution of the program from the point where the speculative execution left off.

In a further variation, checkpointing the old value of the register involves first determining if the register has already been checkpointed. This entails examining a checkpoint table, which contains information specifying which registers have been checkpointed during the speculative execution. If the register has not already been checkpointed, the system checkpoints an old value for the register, and updates the checkpoint table to indicate that the register has been checkpointed.

In a further variation, checkpointing the old value of the register involves storing the old value in a checkpoint queue, which contains checkpoints for registers that have been updated during speculative execution.

In a further variation, the processor supports nested speculative execution. In this variation, the checkpoint table has a separate column associated with each nested level of speculative execution.

In a further variation, there exists a separate checkpoint queue for each nested level of speculative execution.

In a further variation, there exists a combined checkpoint queue containing register checkpoints for all nested levels of speculative execution.

In a further variation, the processor supports register renaming. In this variation, checkpointing the old value of the register involves storing a physical register number and a corresponding architectural register number for the register in the checkpoint queue.

In a further variation, if the speculation turns out to be incorrect, the system uses the physical register numbers and the corresponding architectural register numbers from the checkpoint queue to restore a rename map to reflect the architectural state of the processor at the point of speculation. The system also resumes execution of the program at the point of speculation.

In a variation on this embodiment, the long latency instruction can include a load instruction that generates a cache miss.

Note that the embodiment of the present invention described above does not copy any architectural register to memory (or a temporary storage area) at the point of speculation. Instead, it defers copying the state of any architectural register until that register needs to be overwritten during the course of the speculation. The system also keeps track of which architectural registers have already been copied to avoid saving a register more than once. If the speculation turns out to be incorrect, only the architectural registers that were overwritten are restored using the checkpointed values. This is in contrast to the common technique, which restores the state of every architectural register when the speculation turns out to be incorrect.

The present invention improves system performance because speculative instructions usually only write a very small portion of the architectural register state. This is especially true for windowed register architectures because very few windows tend to be active at any one time. Hence, the present invention provides the following benefits. (1) It prevents register checkpointing from delaying the start of speculation. (2) It minimizes the number of architectural registers that have to be copied, which in turn minimizes the size of the storage area for the architectural registers, and also minimizes the bandwidth required for the copying. (3) It spreads out the copying of registers over a period of time, thereby allowing the copying to be performed using otherwise idle resources. (4) It also minimizes the number of architectural registers that have to be restored when the speculation turns out to be incorrect. This in turn reduces the time it takes to restore the checkpoint and minimizes the bandwidth required for restoring the checkpoint. Hence, the present invention enables a large architectural register set to be checkpointed quickly and with minimal space.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor with Register Checkpointing Support

Figure 1:
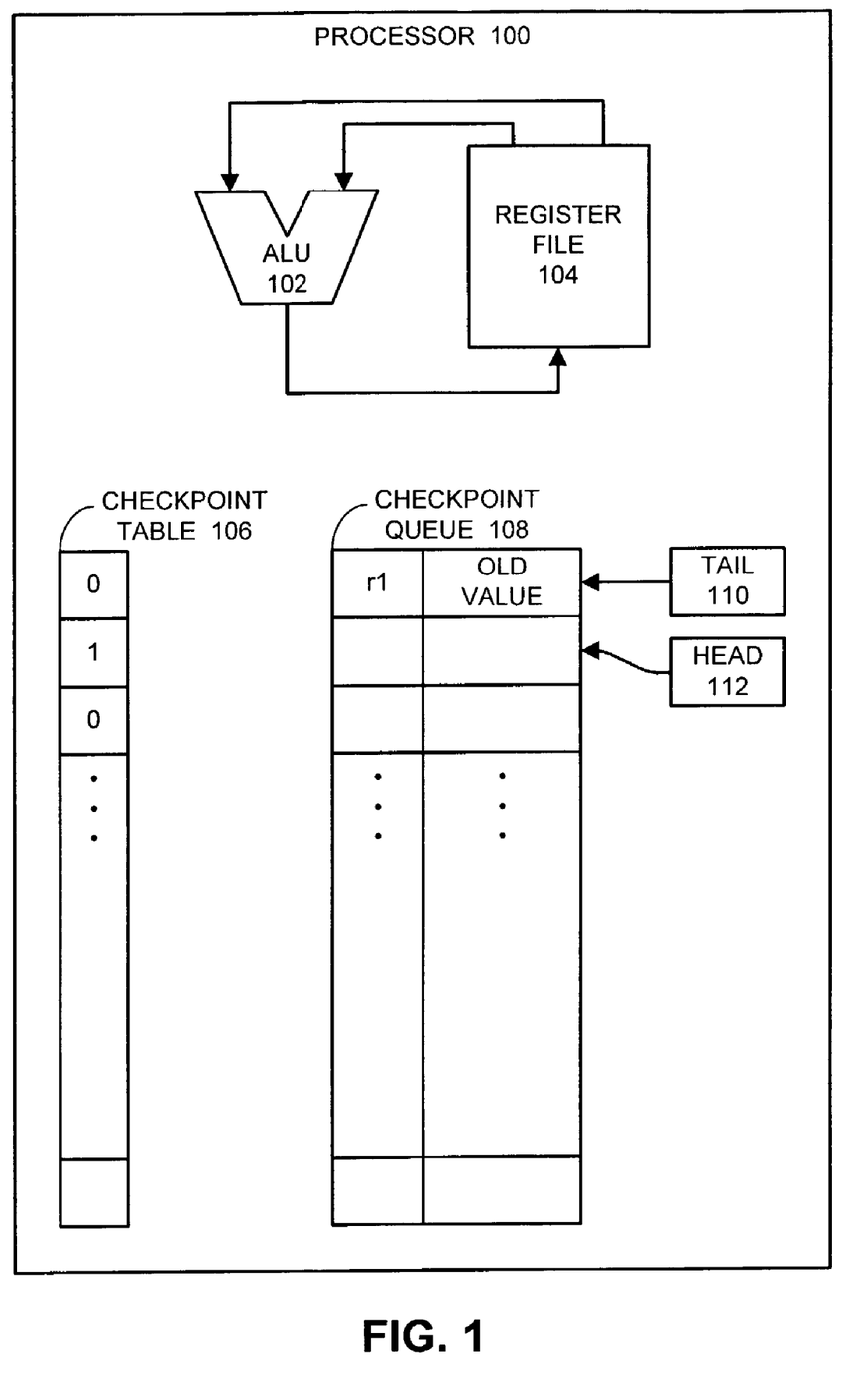
FIG. 1 illustrates a processor including hardware structures to support register checkpointing in accordance with an embodiment of the present invention.

FIG. 1 illustrates a processor including hardware structures to support register checkpointing in accordance with an embodiment of the present invention. As is illustrated in FIG. 1, processor 100 includes a register file 104, which stores operands for computational operations that are performed by arithmetic logic unit (ALU) 102. Note that although a simple register file 104 is illustrated in FIG. 1, the present invention can generally be applied to checkpointing registers for systems that contain any type of register architecture, including systems that support register windowing and register renaming.

In addition to register file 104 and ALU 102, processor 100 includes hardware structures that support register checkpointing. These hardware structures include checkpoint table 106 and checkpoint queue 108. Checkpoint table 106 is indexed by architectural register number and keeps track of whether or not an architectural register has been checkpointed. In one embodiment of the present invention checkpoint table 106 contains an entry for each architectural register, wherein each entry comprises a single bit. An entry with a value of one indicates that the corresponding architectural register has already been checkpointed, while an entry with a value of zero indicates that the corresponding architectural register has not yet been checkpointed.

In one embodiment of the present invention checkpoint queue 108 is implemented as a First-In-First-Out (FIFO) buffer, wherein each entry includes two fields. The first field stores the architectural register number (r1). The second field stores the old value that has been checkpointed for the architectural register. Checkpoint queue 108 also includes a head pointer 112 and a tail pointer 110. Head pointer 112 points to the newest entry in the queue, while tail pointer 110 points to the oldest entry. An empty queue is indicated by head pointer and tail pointer pointing to invalid checkpoint queue entries (e.g. −1). At start up, the head pointer and tail pointer are initialized to indicate an empty queue.

These hardware structures are used in the following manner. When a speculative instruction is about to be retired, checkpoint table 106 is consulted by indexing it with the architectural register number of the instruction's destination register. If the corresponding entry in checkpoint table 106 is set, the architectural register has already been checkpointed, and the register can be overwritten. Note that because of the tendency of the speculative instructions to repeatedly modify only a small subset of the architectural register state, this is the most common case.

If the bit is not set, the corresponding architectural register has not yet been checkpointed. In this case, the old value is read from the architectural register and a new entry is allocated in the checkpoint queue 108. Head pointer 112 is set to point to this new entry, and the architectural register number and the old value are stored in the new entry. The architectural register can then be overwritten with the new value.

When the speculation is resolved, all the entries in checkpoint table 106 are reset to zero. If the speculation turns out to be correct, checkpoint queue 108 is flushed by re-initializing head pointer 112 and tail pointer 110. If the speculation turns out to be incorrect, all valid entries in checkpoint queue 108 are used to restore the corresponding architectural registers to their state at the point where speculation commenced. This may take multiple clock cycles, but is not expected to have a significant performance impact because most speculations tend to be correct. Checkpoint queue 108 is then flushed by re-initializing head pointer 112 and tail pointer 110.

Hardware Structures to Support Nested Checkpointing

Note that the present invention can be extended to facilitate nested speculation by accommodating multiple outstanding checkpoints. Note that nested speculation takes place when a new speculation commences before the outcome of the previous speculation is known. This can be done in a number of ways.

Figure 2:
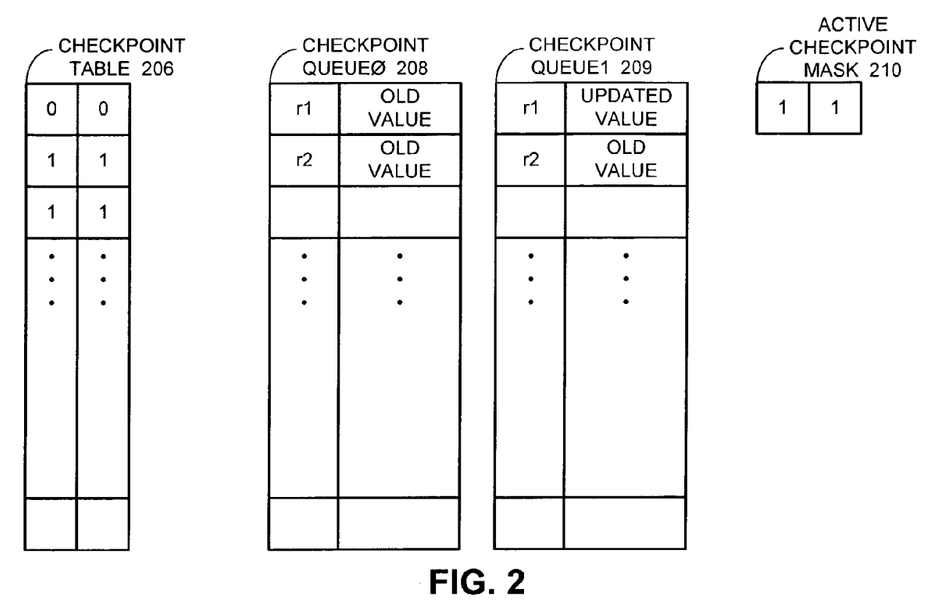
FIG. 2 illustrates hardware structures to support register checkpointing for nested speculative execution in accordance with an embodiment of the present invention.

FIG. 2 illustrates hardware structures to support checkpointing for nested speculative execution in accordance with an embodiment of the present invention. In this embodiment, checkpoint table 206 includes N bits per entry. Each bit indicates whether the architectural register corresponding to the entry has already been saved for the corresponding checkpoint. Note that there are multiple checkpoint queues 208-209, wherein each queue is associated with a different checkpoint. In addition, a N-bit wide register called the "active checkpoint mask" 210 is used to specify which checkpoints are currently active. If a checkpoint is currently active, its bit in active checkpoint mask 210 is set to one. Otherwise, its bit is set to zero.

When a speculative instruction is about to be retired, checkpoint table 206 is consulted by indexing it with the architectural register number of the instruction's destination register. If the checkpoint table entry has ALL of its bits corresponding to the currently outstanding checkpoints set (i.e. the logical AND of the checkpoint table entry bits and active checkpoint mask 210 is equal to the active checkpoint mask 210), the corresponding architectural register has already been checkpointed for all the currently outstanding checkpoints. Hence, processor 100 can go ahead and overwrite the register.

If any of the bits corresponding to the currently outstanding checkpoints is not set (i.e. the logical AND of the checkpoint table entry bits and active checkpoint mask 210 is not equal to the active checkpoint mask 200), the corresponding architectural register has not yet been checkpointed for one or more currently outstanding checkpoints. In this case, an old value of the architectural register is read and an entry is allocated for it in each of the checkpoint queues corresponding to the checkpoints where that register has not yet been checkpointed. The head pointers for these queues are adjusted to point to the newly allocated entries, and the architectural register number and the old value are stored in these entries. The architectural register can then be overwritten with its new value.

When the speculation is resolved, all the entries in a column of the checkpoint table 206 corresponding to this speculation are reset to zero. If the speculation turns out to be correct, its checkpoint queue is flushed by re-initializing its head and tail pointers. If the speculation turns out to be incorrect, values from valid entries in its checkpoint queue are used to restore the corresponding architectural registers. The checkpoint queue is then flushed by re-initializing its head and tail pointers. Further, the bit corresponding to the resolved speculation in the checkpoint mask is set to 0.

Now consider the case of a nested speculation, in which a second speculation takes place before a first speculation is resolved. The system works in the same as it does in the case of a single speculation, except that if the first speculation is resolved first and is incorrect, the checkpoint table entries for both the first and second speculations are cleared. Also, the checkpoint queues for the first speculation is used to update the architectural registers. If the second speculation is resolved first and is incorrect, the checkpoint for the second speculation is used to update the architectural registers. The checkpoint for the first speculation is maintained until the first speculation is resolved.

Although FIG. 2 illustrates hardware structures to support two levels of speculation, one of skill in the art can easily extend the same ideas to support N levels of speculation.

Combined Checkpoint Queue

Figure 3:
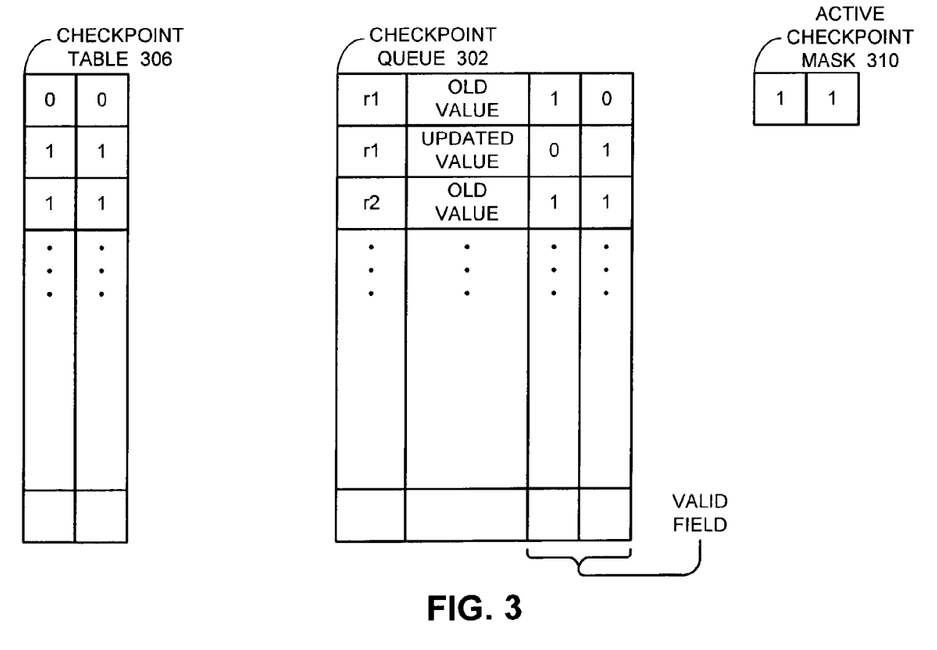
FIG. 3 illustrates hardware structures to support register checkpointing for nested speculative execution in accordance with another embodiment of the present invention.

In one embodiment of the present invention, the separate checkpoint queues are combined into a single checkpoint queue as is illustrated in FIG. 3. In FIG. 3, checkpoint table 306 is the same as checkpoint table 206 illustrated in FIG. 2 and hence has N bits per entry. However, the multiple checkpoint queues 208-209 illustrated in FIG. 2 are combined into a single checkpoint queue 302. Each entry in checkpoint queue 302 includes a valid field that is N-bits wide and contains one bit for each nested checkpoint that can be supported. This valid field specifies which checkpoint(s) the entry is associated with. Also note that active checkpoint mask 310 is the same as active checkpoint mask 210 in FIG. 2.

The hardware structures illustrated in FIG. 3 operate in essentially the same manner as the hardware structures illustrated in FIG. 2. The only difference is that checkpoint queue 302 is used to store all of the checkpoint values, and valid fields 302 are used to specify which checkpoints a given entry is valid for. Hence, when a value in a register is checkpointed into checkpoint queue 302, the valid field of the new queue entry is set to reflect which checkpoint(s) this entry is valid for.

If the speculation turns out to be correct, entries in checkpoint queue 302 having a valid field indicating that the entry is used only for this checkpoint are flushed. Also, all the valid bits corresponding to this checkpoint in the checkpoint queue 302 are reset. Further, the bit column for this checkpoint in the checkpoint mask 306 and active checkpoint mask 310 are reset. Note that head and tail pointers for valid queue 302 (not shown) are adjusted to reflect the deletion of these entries.

If the speculation turns out to be incorrect, all the entries in checkpoint queue 302 having a valid field indicating that the entry is associated with the checkpoint are used to restore the architectural registers for the checkpoint. In addition, entries in checkpoint queue 302 having a valid field indicating that the entry is used only for this checkpoint or for later checkpoints are flushed, and the head and tail pointers for checkpoint queue 302 are adjusted to reflect the deletion of these entries. Also, all the valid bits corresponding to this checkpoint and later checkpoints in the checkpoint queue 302 are reset. Further, the bit columns for this and later checkpoints in the checkpoint mask 306 and active checkpoint mask 310 are reset.

Implementation with Register Renaming

Figure 4:
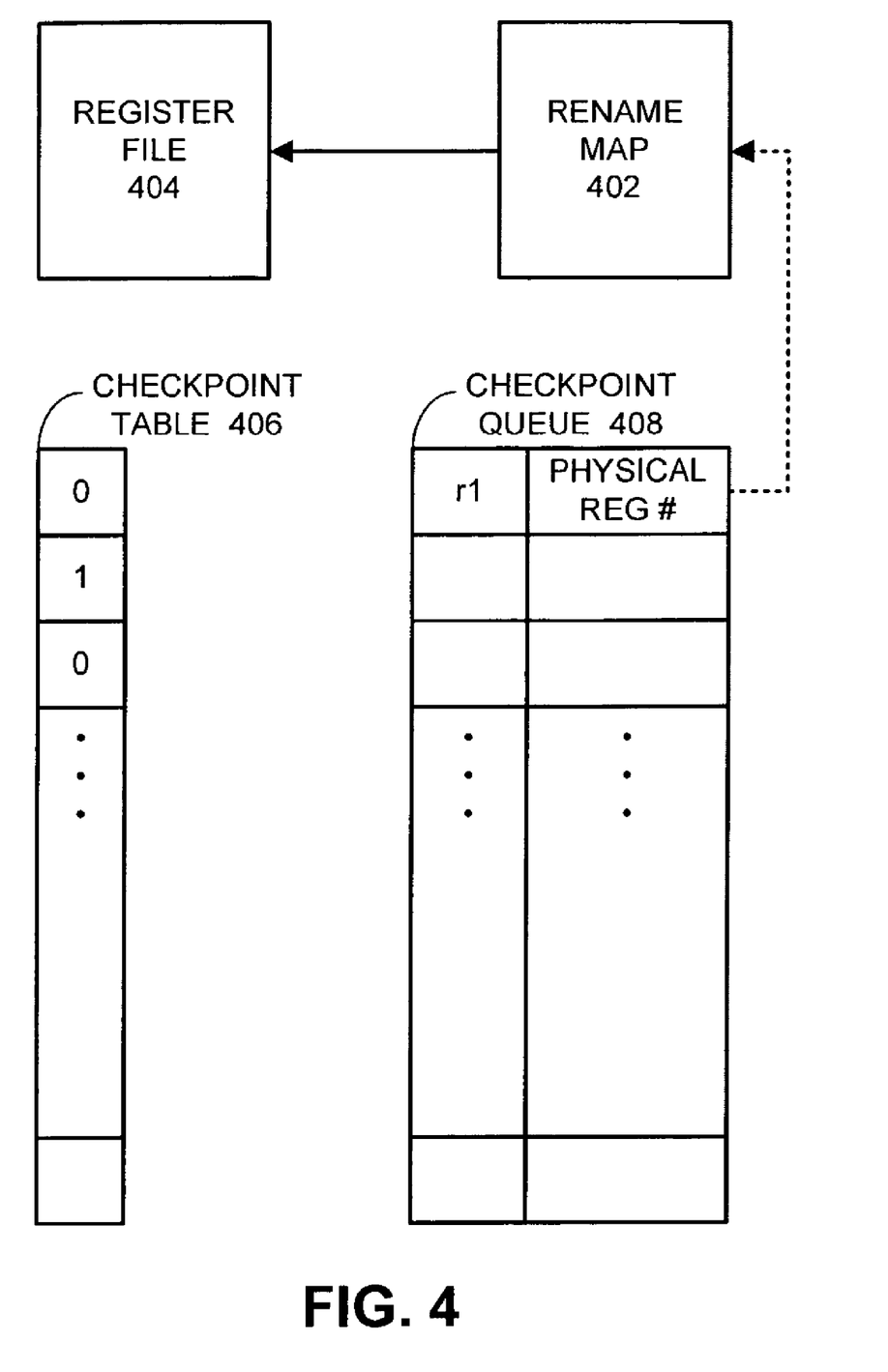
FIG. 4 illustrates hardware structures to support register checkpointing in a processor that supports register renaming in accordance with another embodiment of the present invention.

FIG. 4 illustrates a scheme for implementing register checkpointing within a processor that implements register renaming, wherein a single physical register file holds the architectural as well as speculative register state. In such a processor, in the absence of register checkpointing, whenever an instruction that writes a destination register is renamed, a physical register is assigned to the destination register from the free list. When this instruction retires, the previous physical register assigned to the same destination register is returned to the free list, because at this point, it can be guaranteed that there will be no more uses of that physical register.

To implement our new scheme, the second field in checkpoint queue 408 is modified to store a physical register number instead of the checkpointed value. No changes are needed for checkpoint table 406.

In this scheme, whenever a speculative instruction that writes a destination register is about to be retired, checkpoint table 406 is consulted to determine if this destination register has already been checkpointed. If it has, the previous physical register assigned to the same destination register is returned to the free list as usual. Otherwise, the previous physical register assigned to the same destination register is not returned to the free list. Instead, both the physical register number and the architectural register number of the destination register are recorded in checkpoint queue 408.

When the speculation is resolved, all the entries in checkpoint table 406 are reset to zero. If the speculation turns out to be correct, all the physical registers recorded in checkpoint queue 408 are returned to the free list and checkpoint queue 408 is flushed by re-initializing its head and tail pointers. If the speculation turns out to be incorrect, all the mappings recorded in checkpoint queue 408 are written back to the rename map. In addition, all the physical registers that have been assigned to instructions that have not been retired are reclaimed (which is similar to what happens in regular branch misprediction recovery) and checkpoint queue 408 is flushed by re-initializing its head and tail pointers.

The following example helps illustrate this scheme:

add1 ->r1 (assigned to p1)

add2 ->r1 (assigned to p2)

- - - start of speculation - - - add3 ->r1 (assigned to p3)

add4 ->r1 (assigned to p4)

In this example, when add2 retires, p1 is returned to the free list. When add3 retires during speculation, the mapping r1 ->p2 is recorded in checkpoint queue 408 and p2 is not freed. When add4 retires during speculation, p3 is returned to the free list. If the speculation turns out to be correct, p2 is returned to the free list. If the speculation turns out to be wrong, the mapping r1 ->p2 is written to the rename map and p4 is freed.

This new scheme is advantageous in that it does not require extra ports to the physical register file because it does not require the old value to be read out from the physical register file when a speculative instruction is retired. In addition, by storing the checkpointed register values in the physical register file instead of checkpoint queue 408, it reduces the size of checkpoint queue 408 at the expense of a possibly larger physical register file. As we discussed earlier, typically a few architectural registers are repeatedly written into during speculation. However, if the number of distinct architectural registers are written into during speculation approaches the available number of physical registers, then the processor will stall but not deadlock. In due course, the speculation is resolved and physical registers are freed to enable the processor to continue renaming instructions.

This scheme can also be extended to allow N multiple outstanding checkpoints as in the other embodiments of the present invention described above.

Speculative Execution Process

Figure 5:
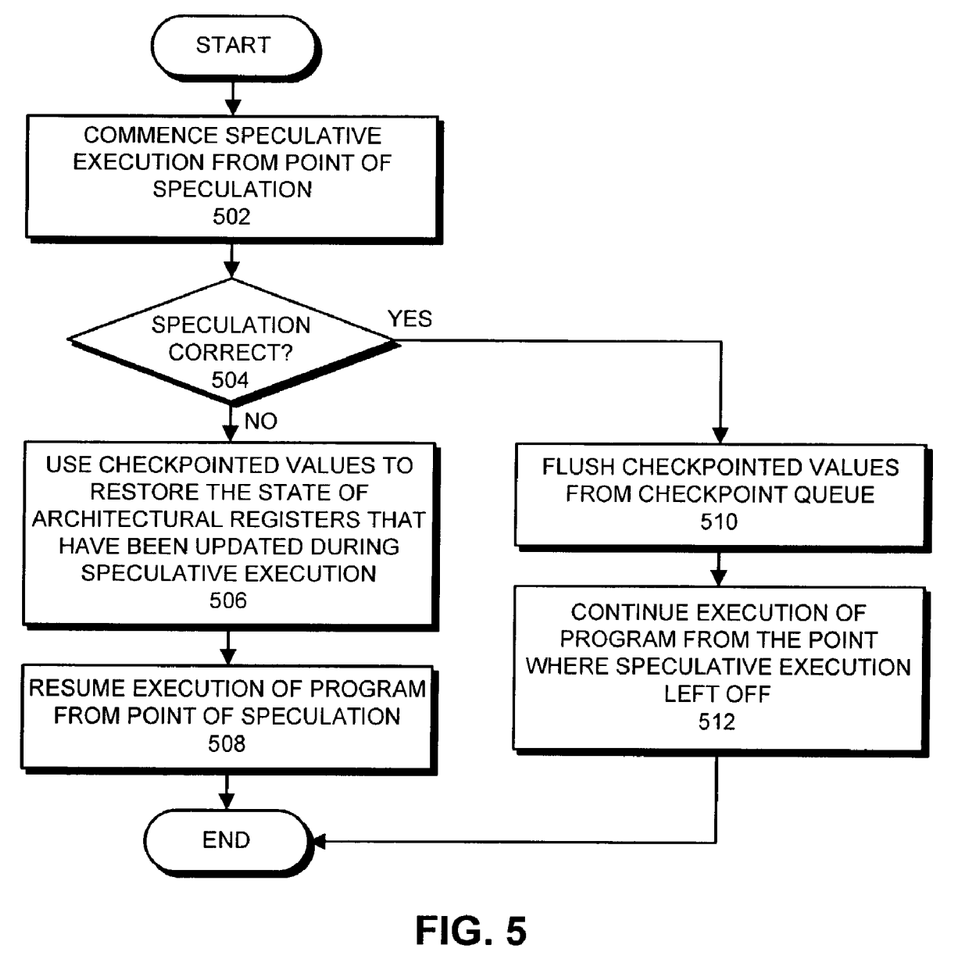
FIG. 5 presents a flow chart illustrating the speculative execution process in accordance with an embodiment of the present invention.

FIG. 5 presents a flow chart summarizing the speculative execution process in accordance with an embodiment of the present invention. During execution of the program, the system commences speculative execution from a point of speculation, at which the outcome of a long latency instruction is speculatively predicted (step 502). During this speculative execution process, values in architectural registers are checkpointed before the architectural registers are modified as is described below with reference to FIG. 6.

At some time in the future, the speculation is resolved. At this point, if the speculation was correct, the system flushes checkpointed values from the checkpoint queue (step 510), and continues execution of the program from the point where speculative execution left off (step 512).

Otherwise, if the speculation was not correct, the system uses the checkpointed values from the checkpoint queue to restore the state of architectural registers that have been updated during the speculative execution process (step 506). The system then resumes execution of the program from the point of speculation (step 508).

Checkpointing Process

Figure 6:
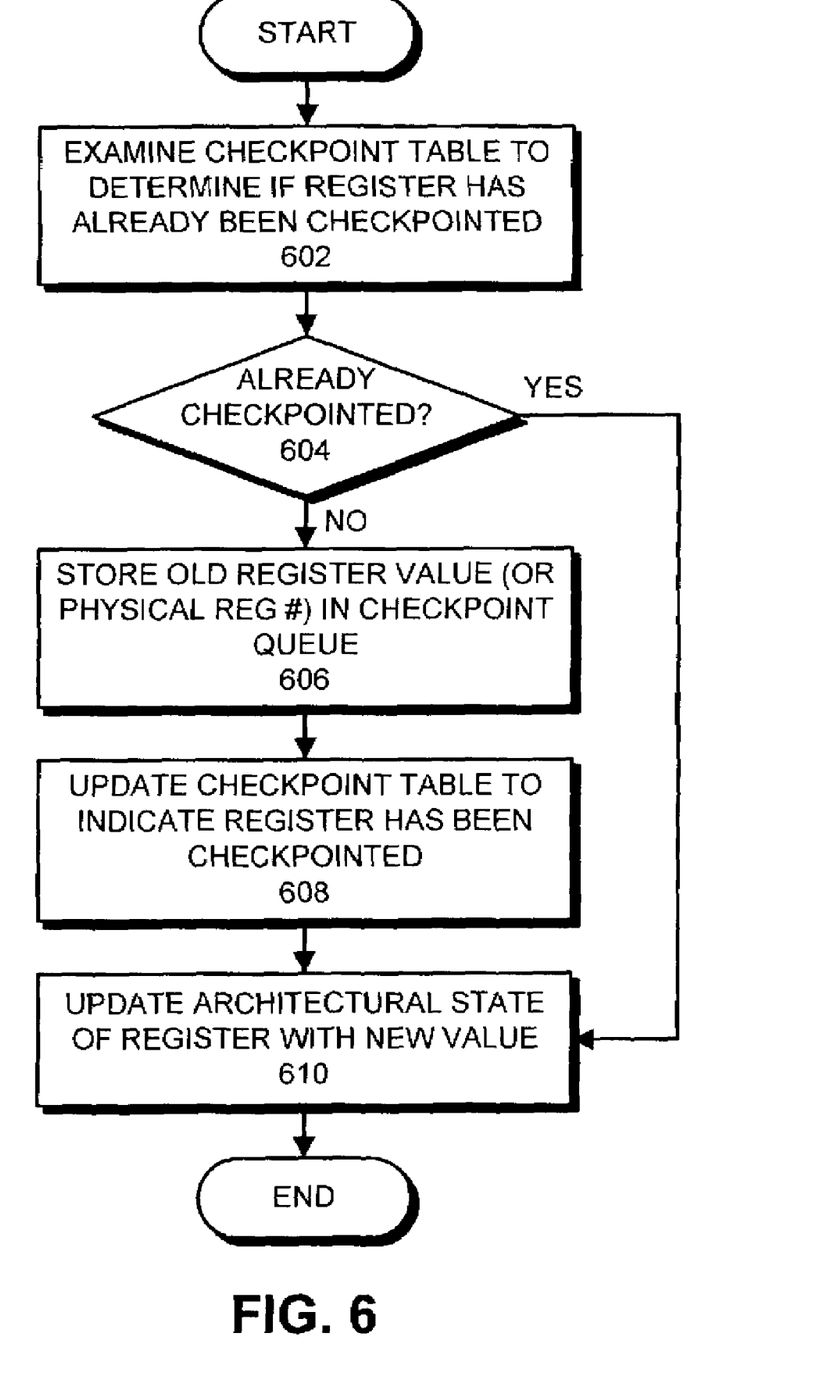
FIG. 6 presents a flow chart illustrating the checkpointing process in accordance with an embodiment of the present invention.

FIG. 6 presents a flow chart summarizing the checkpointing process in accordance with an embodiment of the present invention. The system starts with a new value to be written to a destination register. Next, the system examines the checkpoint table to determine if the register has already been checkpointed (step 602). If so, the system updates the architectural state of the register with the new value (step 610). If not, the system checkpoints the old register value (or in the case of the register renaming implementation, the physical register number), and then updates the checkpoint table to indicate that the register has been checkpointed. The system then updates the architectural state of the register with the new value (step 610).

Note that it is desirable for this checkpointing operation to be atomic, so that steps 602 through 610 can complete, without another process interfering with the checkpointing operation.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing register file checkpointing to support speculative execution within a processor, comprising:

commencing speculative execution of a program from a point of speculation, at which the outcome of a long latency instruction is speculatively predicted;

wherein updating a register with a new value during the speculative execution involves, checkpointing an old value of the register when the register has not already been checkpointed, wherein checkpointing the old value of the register involves:

determining if the register has already been checkpointed by examining a checkpoint table, wherein the checkpoint table contains an entry for each architectural register, wherein each entry comprises a single bit specifying if the corresponding register has been checkpointed during the speculative execution, and if the register has not already been checkpointed, checkpointing the old value for the register, and updating the checkpoint table to indicate that the register has been checkpointed, and updating the architectural state of the register with the new value;

whereby only registers that are updated during the speculative execution are checkpointed, instead of checkpointing all of the architectural registers prior to commencing speculative execution.

2. The method of claim 1, wherein if the speculation turns out to be incorrect, the method further comprises:
   using the checkpointed values to restore the architectural state of registers that have been updated during the speculative execution; and
   resuming execution of the program from the point of speculation.

3. The method of claim 1, wherein if the speculation turns out to be correct, the method further comprises:
   flushing the checkpointed values; and
   continuing execution of the program from the point where the speculative execution left off.

4. The method of claim 1, wherein checkpointing the old value of the register involves storing the old value in a checkpoint queue, which contains checkpoints for registers that have been updated during the speculative execution.

5. The method of claim 4,
   wherein the processor supports nested speculative execution; and
   wherein the checkpoint table has a separate column associated with each nested level of speculative execution.

6. The method of claim 4,
   wherein the processor supports nested speculative execution; and
   wherein there exists a separate checkpoint queue for each nested level of speculative execution.

7. The method of claim 4,
   wherein the processor supports nested speculative execution; and
   wherein there exists a combined checkpoint queue that contains register checkpoints for all nested levels of speculative execution.

8. The method of claim 4,
   wherein the processor supports register renaming; and
   wherein checkpointing the old value of the register involves storing a physical register number and a corresponding architectural register number for the register in the checkpoint queue.

9. The method of claim 8, wherein if the speculation turns out to be incorrect, the method further comprises:
   using the physical register numbers and the corresponding architectural register numbers from the checkpoint queue to restore a rename map to reflect the architectural state of the processor at the point of speculation; and
   resuming execution of the program at the point of speculation.

10. The method of claim 1, wherein the long latency instruction can include a load instruction that generates a cache miss.

11. An apparatus that performs register file checkpointing to support speculative execution, comprising:
    a processor that supports speculative execution of a program from a point of speculation, at which the outcome of a long latency instruction is speculatively predicted;
    a register file within the processor;
    a register updating mechanism, wherein during speculative execution the register updating mechanism is configured to,
      checkpointing an old value of the register when the register has not already been checkpointed, wherein checkpointing the old value of the register involves:
        determining if the register has already been checkpointed by examining a checkpoint table, wherein the checkpoint table contains an entry for each architectural register, wherein each entry comprises a single bit specifying if the corresponding register has been checkpointed during the speculative execution, and
        if the register has not already been checkpointed, checkpointing the old value for the register, and
      updating the checkpoint table to indicate that the register has been checkpointed, and
      updating the architectural state of the register with a new value;
    whereby only registers that are updated during the speculative execution are checkpointed, instead of checkpointing all of the architectural registers prior to commencing speculative execution.

12. The apparatus of claim 11, wherein if the speculation turns out to be incorrect, the processor is configured to:
    use the checkpointed values to restore the architectural state of registers that have been updated during the speculative execution; and to
    resume execution of the program from the point of speculation.

13. The apparatus of claim 11, wherein if the speculation turns out to be correct, the processor is configured to:
    flush the checkpointed values; and to
    continue execution of the program from the point where the speculative execution left off.

14. The apparatus of claim 11, further comprising:
    a checkpoint queue which contains checkpoints for registers that have been updated during the speculative execution;
    wherein while checkpointing the old value of the register, the register updating mechanism is configured to store the old value in the checkpoint queue.

15. The apparatus of claim 14,
    wherein the processor supports nested speculative execution; and
    wherein the checkpoint table has a separate column associated with each nested level of speculative execution.

16. The apparatus of claim 14,
    wherein the processor supports nested speculative execution; and
    wherein there exists a separate checkpoint queue for each nested level of speculative execution.

17. The apparatus of claim 14,
    wherein the processor supports nested speculative execution; and
    wherein there exists a combined checkpoint queue that contains register checkpoints for all nested levels of speculative execution.

18. The apparatus of claim 14,
    wherein the processor supports register renaming; and
    wherein the register updating mechanism is configured to store a physical register number and a corresponding architectural register number for the register in the checkpoint queue.

19. The apparatus of claim 18, wherein if the speculation turns out to be incorrect, the processor is configured to:
    use the physical register numbers and the corresponding architectural register numbers from the checkpoint queue to restore a rename map to reflect the architectural state of the processor at the point of speculation; and to
    resume execution of the program at the point of speculation.

20. The apparatus of claim 11, wherein the long latency instruction can include a load instruction that generates a cache miss.

21. An computer system that performs register file checkpointing to support speculative execution, comprising:
- a processor that supports speculative execution of a program from a point of speculation, at which the outcome of a long latency instruction is speculatively predicted;
- a memory;
- a register file within the processor;
- a register updating mechanism, wherein during speculative execution the register updating mechanism is configured to,
  - checkpointing an old value of the register when the register has not already been checkpointed, wherein checkpointing the old value of the register involves:
    - determining if the register has already been checkpointed by examining a checkpoint table, wherein the checkpoint table contains an entry for each architectural register, wherein each entry comprises a single bit, and
    - if the register has not already been checkpointed, checkpointing the old value for the register, and
    - updating the checkpoint table to indicate that the register has been checkpointed, and
  - updating the architectural state of the register with a new value;
- whereby only registers that are updated during the speculative execution are checkpointed, instead of checkpointing all of the architectural registers prior to commencing speculative execution.

* * * * *